United States Patent
Taki et al.

(10) Patent No.: US 7,109,844 B2
(45) Date of Patent: Sep. 19, 2006

(54) TRANSPONDER, INTERROGATOR, AND COMMUNICATION SYSTEM

(75) Inventors: Kazunari Taki, Nagoya (JP); Tsuyoshi Ohashi, Hashima (JP); Takuya Nagai, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 344 days.

(21) Appl. No.: 10/670,422

(22) Filed: Sep. 26, 2003

(65) Prior Publication Data

US 2004/0070490 A1    Apr. 15, 2004

(30) Foreign Application Priority Data

Sep. 30, 2002    (JP)    ............... 2002-284939

(51) Int. Cl.
*H04Q 7/00* (2006.01)
*H04B 1/38* (2006.01)
*H04L 7/00* (2006.01)

(52) U.S. Cl. .................... 340/10.1; 340/10.2; 375/219; 375/357

(58) Field of Classification Search ............... 340/10.1, 340/10.2, 10.3, 10.4–10.5; 455/85, 41–41.1, 455/45–46, 151.2; 375/219, 2, 7, 130–136; 343/7.6; 178/22

See application file for complete search history.

(56) References Cited

U.S. PATENT DOCUMENTS

| | | | | |
|---|---|---|---|---|
| 4,206,462 A | * | 6/1980 | Rabow et al. | 342/60 |
| 4,804,961 A | * | 2/1989 | Hane | 342/125 |
| 5,426,667 A | * | 6/1995 | van Zon | 375/219 |
| 6,014,406 A | * | 1/2000 | Shida et al. | 375/133 |
| 6,177,861 B1 | | 1/2001 | MacLellan et al. | |
| 6,265,963 B1 | * | 7/2001 | Wood, Jr. | 340/10.4 |
| 6,356,230 B1 | * | 3/2002 | Greef et al. | 342/127 |
| 6,650,695 B1 | * | 11/2003 | Girard | 375/219 |
| 6,658,044 B1 | * | 12/2003 | Cho et al. | 375/135 |

FOREIGN PATENT DOCUMENTS

| | | |
|---|---|---|
| JP | A 7-23467 | 1/1995 |
| JP | A 2000-49656 | 2/2000 |
| JP | A 2000-174667 | 6/2000 |
| JP | A 2001-102964 | 4/2001 |

* cited by examiner

*Primary Examiner*—Wendy R. Garber
*Assistant Examiner*—Nam Nguyen
(74) *Attorney, Agent, or Firm*—Oliff & Berridge, PLC

(57) ABSTRACT

A communication system 1 includes interrogators 10, 11 and transponders 20, 21, 22. The interrogator 10 transmits a carrier wave, FC1, to the transponders 20, 21, 22, and the transponders 20, 21, 22 return respective reflected waves, f1, f2, and f3, to the interrogator 10. The transponders 20, 21, 22 modulate the received carrier waves FC1 using respective subcarrier waves that have been modulated using respective information signals, and return the thus modulated carrier waves as the reflected waves f1, f2, and f3 to the interrogator 10. The transponders 20, 21, 22 hop the frequencies of the subcarrier waves according to respective different hopping patterns, such that an initial hopping frequency with which each of the frequency hopping patterns begins represents right-hand two bit values of a four-bit identification code of a corresponding one of the transponders 20, 21, 22, and respective hopping frequencies of the each frequency hopping pattern represent respective bit values of four-bit transmission data transmitted from the corresponding transponder 20, 21, 22 to the interrogator 10.

23 Claims, 11 Drawing Sheets

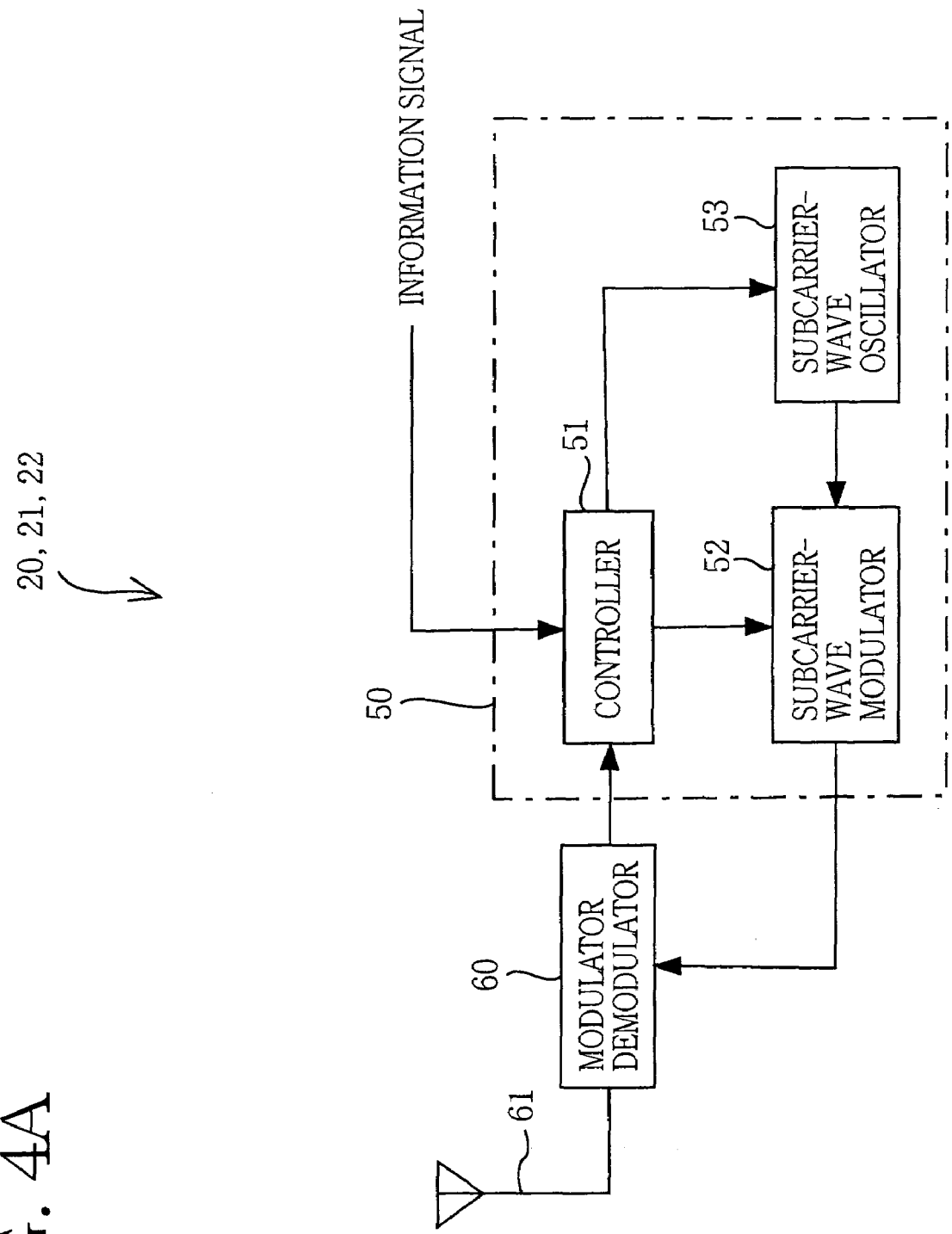

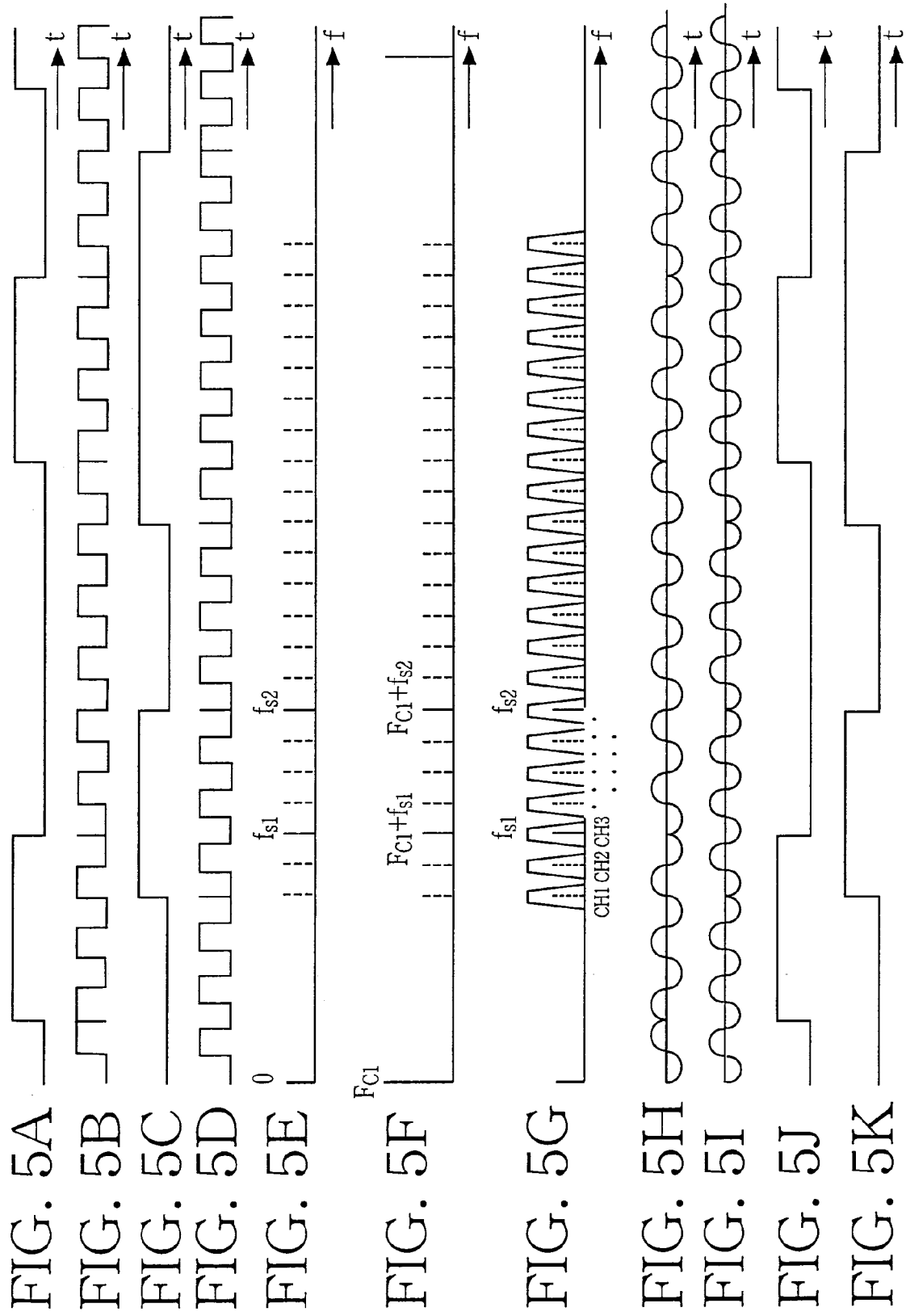

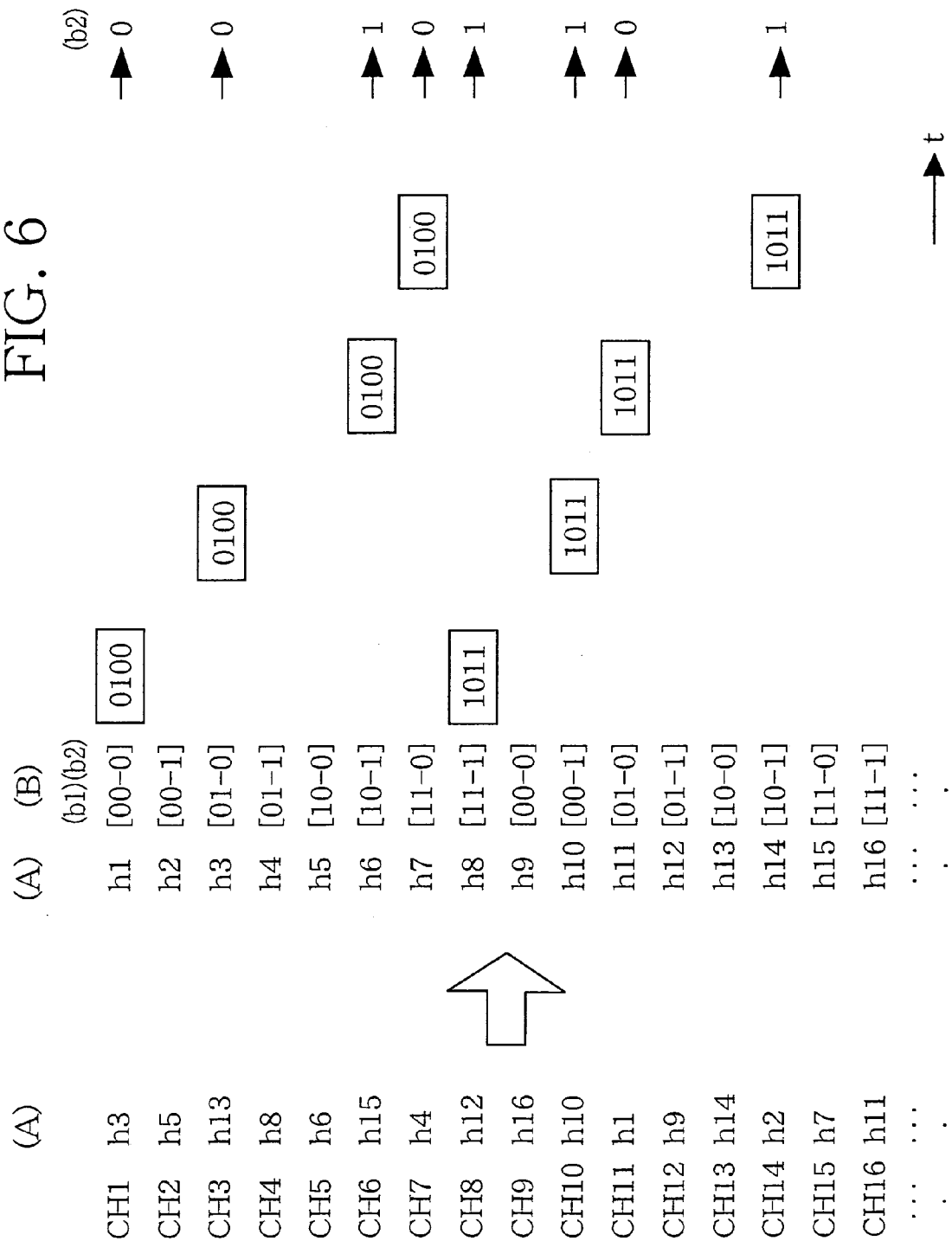

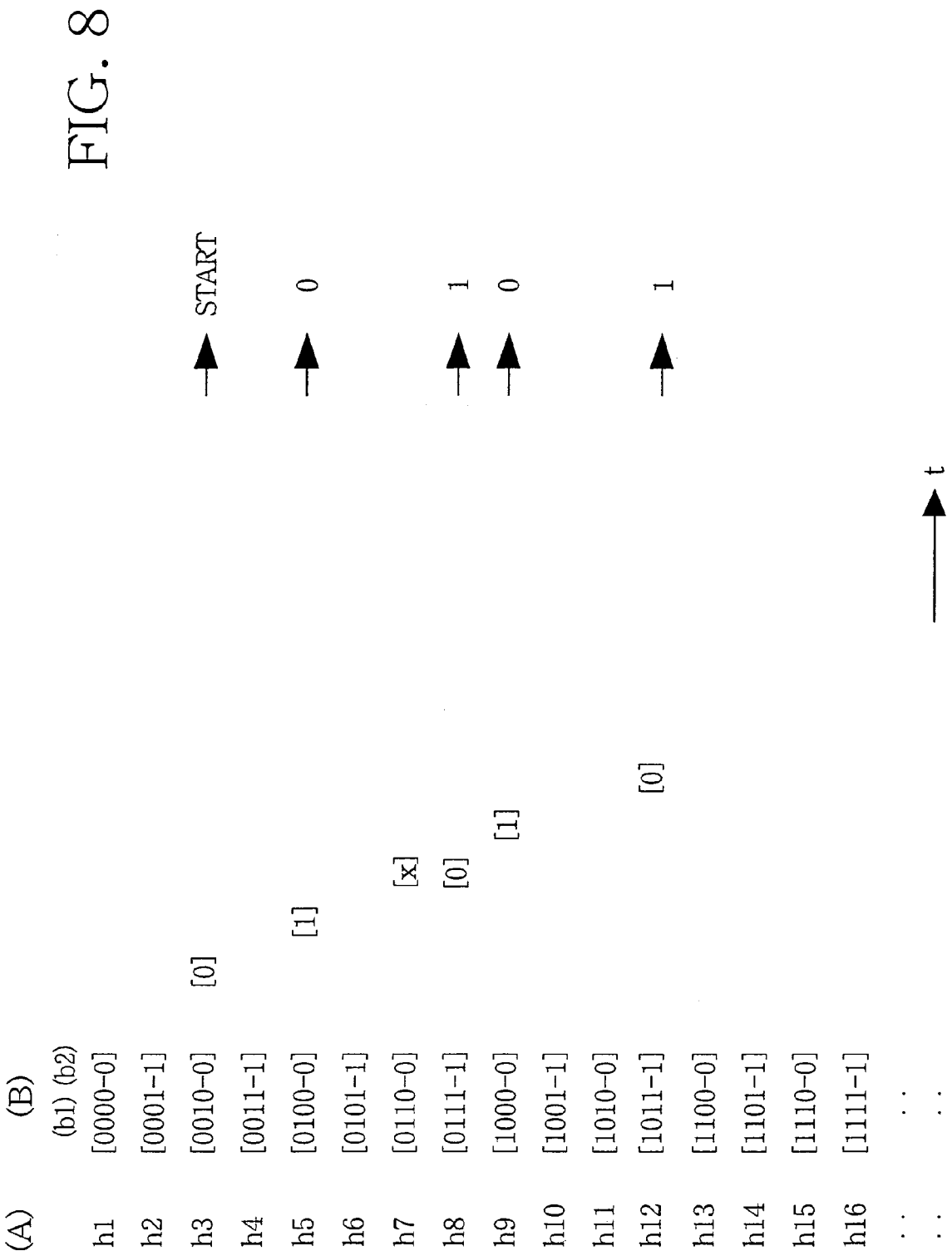

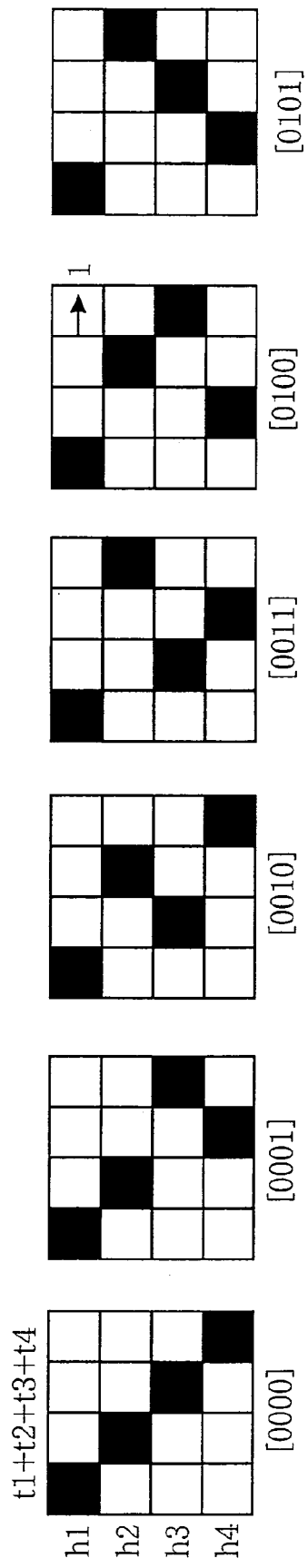

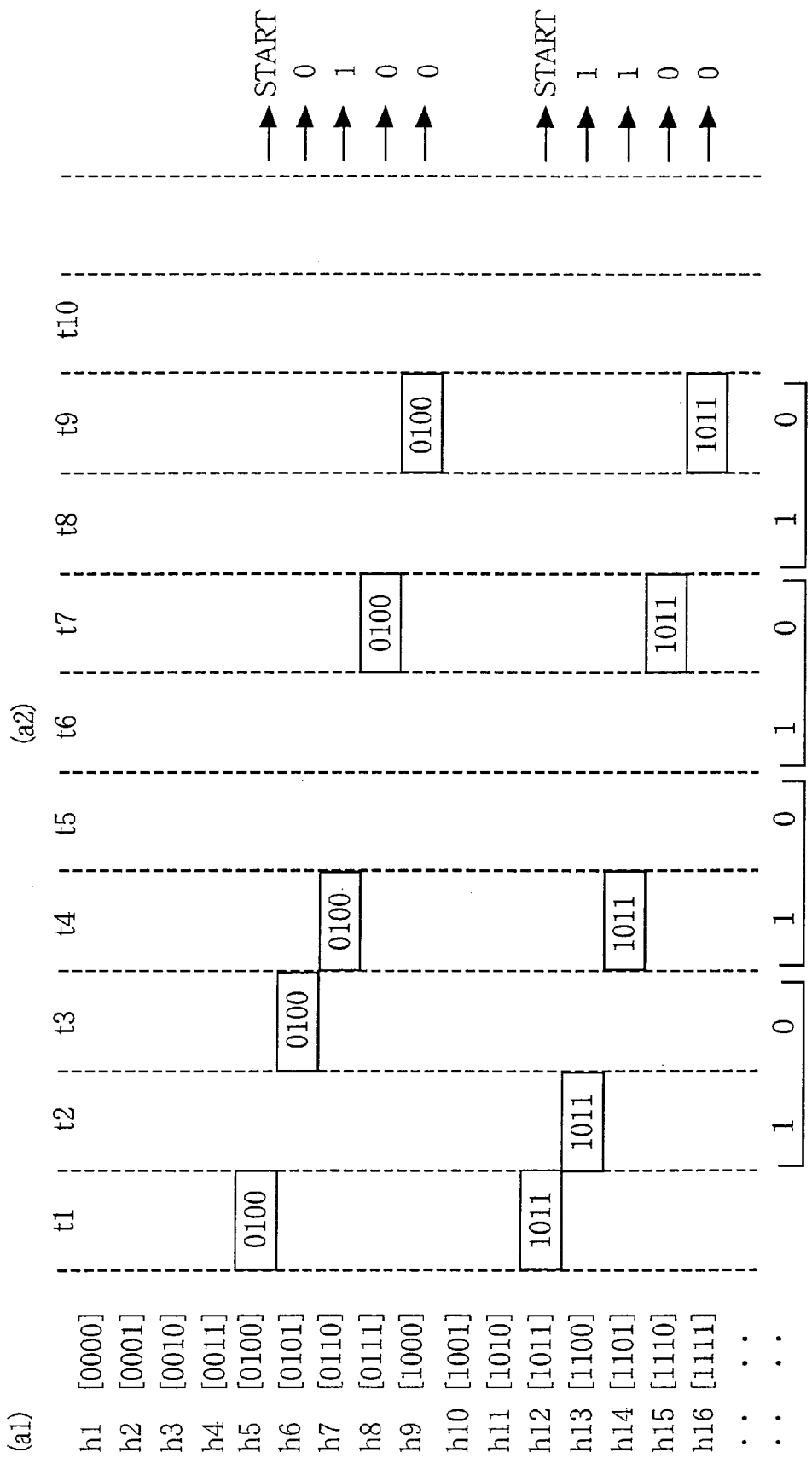

TRANSPONDER, INTERROGATOR, AND COMMUNICATION SYSTEM

BACKGROUND OF THE INVENTION

1. Field of the Invention

The present invention relates to a transponder, an interrogator, and a communication system in which an interrogator transmits a carrier wave to a transponder and the transponder receives the carrier wave, modulates the received carrier wave, and returns the modulated carrier wave as a reflected wave to the interrogator.

2. Discussion of Related Art

Japanese Patent Publication No. 2000-49656 or its corresponding U.S. Pat. No. 6,177,861 discloses a wireless communication system including a plurality of transponders and an interrogator that transmits a carrier wave to the transponders so that each of the transponders modulates the carrier wave using an information signal such as an identification (ID) signal identifying the each transponder, or using a subcarrier wave that has been modulated using the information signal, and returns the modulated carrier wave as a reflected wave to the interrogator.

However, in the case where the communication system employs a great number of transponders, it is difficult, in view of the signal reception and demodulation capacity of the interrogator, to adapt all the transponders to use respective subcarrier waves having different frequencies. Thus, there has been a problem that the total number of subcarrier-wave frequencies that can be used by the transponders is limited and accordingly the probability that the subcarrier waves may interfere with each other is increased. In addition, in the case where each transponder is adapted to be able to change the frequency of subcarrier wave used thereby, the each transponder cannot know the subcarrier-wave frequencies used by the other transponders and accordingly cannot avoid the possibility of interference of subcarrier waves. Moreover, in the case where the communication system employs a plurality of interrogators and those interrogators are adapted to transmit respective carrier waves having different frequencies, each transponder does not have the function of selecting a specific frequency and accordingly modulates and returns all the carrier waves transmitted from the interrogators. Thus, each interrogator cannot avoid receiving the modulated carrier waves returned from all the transponders including other transponders than a target transponder and accordingly the possibility of interference of modulated carrier waves is increased.

SUMMARY OF THE INVENTION

It is therefore an object of the present invention to provide a transponder, an interrogator, and a communication system in which an interrogator can identify a transponder in distinction from another or other transponders. This object may be achieved according to any one of the following modes of the present invention in the form of a transponder, an interrogator, and a communication system, which are numbered like the appended claims and each of which may depend from the other mode or modes, where appropriate, to indicate and clarify possible combinations of technical features. It is, however, to be understood that the present invention is not limited to the technical features or any combinations thereof that will be described below for illustrative purposes only. It is to be further understood that a plurality of features included in any one of the following modes of the invention are not necessarily provided altogether, and that the invention may be embodied without employing at least one of the features described with respect to the same mode.

(1) A transponder for use in a communication system including, in addition to the transponder, an interrogator which transmits a carrier wave to the transponder so that the transponder receives the carrier wave, modulates the received carrier wave, and returns the modulated carrier wave as a reflected wave to the interrogator, the transponder comprising a carrier wave receiving and returning device which receives and returns the carrier wave transmitted from the interrogator; a frequency hopping device which hops a frequency of a subcarrier wave according to a frequency hopping pattern representing a unit data as a first portion of an information signal, and thereby modifies the subcarrier wave; and a carrier wave modulator which modulates, based on the subcarrier wave modified by the frequency hopping device, the carrier wave received by the carrier wave receiving and returning device, so that the carrier wave receiving and returning device returns the modulated carrier wave as the reflected wave to the interrogator.

According to the mode (1), the first portion of the information signal may be the entirety of the information signal. For example, in the case where the information signal comprises an identification (ID) code of the transponder, and transmission data or information to be transmitted from the transponder to the interrogator, the first portion of the information signal may comprise at least one of the transponder's ID code and the transmission information. Thus, the unit data represented by the frequency hopping pattern may comprise at least one of the transponder's ID code and the transmission information. However, the frequency hopping pattern may represent, in addition to the unit data comprising the transmission information as part of the first portion, a portion, or the entirety, of the transponder's ID code as another part of the first portion. Even in the case where a plurality of transponders simultaneously return, to an interrogator, respective reflected waves that have been modulated based on respective subcarrier waves modified according to respective frequency hopping patterns, the interrogator can simultaneously distinguish the respective reflected waves returned from the transponders from each other based on the respective frequency hopping patterns. In addition, the probability that those reflected waves interfere with each other is very small. Therefore, the transponders need not return the respective reflected waves at respective different timings to avoid the interference of the reflected waves. In addition, the interrogator need not control the transponders about their reflected-wave returning operations. For example, the interrogator need to control a transponder to stop its reflected-wave returning operation after the interrogator has received the reflected wave returned from the specific transponder, or need not control a specific transponder to start its reflected-wave returning operation after the interrogator designates an ID code of the specific transponder. Moreover, since the interrogator can obtain the unit data from the frequency hopping pattern, the interrogator can easily correct possible errors of the data and restore the data to its original state.

(2) The transponder according to the mode (1), further comprising a subcarrier wave modulator which modulates the subcarrier wave based on a second portion of the information signal, wherein the carrier wave modulator modulates, based on the subcarrier wave modified by the frequency hopping device and modulated by the subcarrier wave modulator, the carrier wave received by the carrier wave receiving and returning device.

The subcarrier wave modulator may be provided by a conventional subcarrier wave modulator known in the art, for example, a modulator that performs a phase shift keying (PSK) modulation, a qudri-phase shift keying (QPSK) modulation, or a frequency shift keying (FSK) modulation. The second portion of the information signal may be entirely or partly different from the first portion, or may be entirely identical with the first portion. Thus, the second portion may comprise at least one of the transponder's ID code and the transmission information. In the case where the frequency hopping pattern represents the unit data as the first portion comprising both the transponder's ID code and the transmission information, the subcarrier wave modulator may be omitted and accordingly the subcarrier wave may not be modulated.

(3) The transponder according to the mode (2), wherein at least one of the first and second portions of the information signal comprises identification information usable to identify the transponder as a first transponder in distinction from a second transponder of the communication system, and wherein the unit data comprises transmission information to be transmitted, with the identification information, from the transponder to the interrogator.

The identification information may be the ID code of the transponder, or any sort of information that is usable to identify the transponder as the first transponder in distinction from the second transponder of the communication system, for example, a portion of the ID code, or a random number generated by a random number generator.

(4) The transponder according to any of the modes (1) through (3), wherein the unit data consists of at least one bit.

The unit data may consist of, e.g., one bit, 4 bits, or eight bits.

(5) The transponder according to any of the modes (1) through (3), wherein the unit data consists of at least one symbol.

Usually, a symbol is defined as consisting of a plurality of bits. However, as far as the present application is concerned, a symbol may be defined as consisting of at least one bit. In the latter case, the phase "a symbol" encompasses a bit. The unit data may consist of, e.g., one symbol, four symbols, or eight symbols. In the case the unit data consists of four bits and the transponder transmits a plurality of packets each of which consists of eight bits, the frequency hopping pattern is repeatedly used twice to transmit each packet.

(6) The transponder according to the mode (4), wherein the unit data consists of a plurality of bits, and wherein the frequency hopping device hops, according to the frequency hopping pattern representing the plurality of bits, the frequency of the subcarrier wave a plurality of times a total number of which is equal to a total number of the plurality of bits.

According to this mode, the frequency hopping pattern can be simplified and the unit data, i.e., the plurality of bits can be easily restored.

(7) The transponder according to the mode (5), wherein the unit data consists of a plurality of symbols, and wherein the frequency hopping device hops, according to the frequency hopping pattern representing the plurality of symbols, the frequency of the subcarrier wave a plurality of times a total number of which is equal to a total number of the plurality of symbols.

According to this mode, the frequency hopping pattern can be simplified and the unit data, i.e., the plurality of symbols can be easily restored.

(8) The transponder according to any of the modes (1) through (3), (4), and (6), wherein the unit data consists of not greater than eight bits.

In the case where the transponder transmits a plurality of packets each of which consists of more than eight bits, e.g., 128 bits, the transponder may divide each packet into a plurality of unit data each of which consists of not greater than eight bits. In this case, the frequency hopping pattern can be simplified and the unit data can be easily restored.

(9) The transponder according to any of the modes (4), (6), and (8), wherein the unit data consists of the at least one bit that can represent an arbitrary one of two different bit values, and wherein the frequency hopping device hops, according to the frequency hopping pattern representing the at least one bit, the frequency of the subcarrier wave to one of two different hopping frequencies that represent the two different bit values, respectively, the one hopping frequency representing one of the two different bit values that is actually represented by the at least one bit.

In the case where the first and second portions of the information signal commonly comprise the transmission information and the unit data comprises the transmission information, the transmission information has redundancy and accordingly the interrogator can easily restore the transmission information even if one or more errors may occur to the transmission of one of the first and second portions of the information signal.

(10) The transponder according to the mode (5) or (7), wherein the unit data consists of the at least one symbol that can represent an arbitrary one of a plurality of different symbol values, and wherein the frequency hopping device hops, according to the frequency hopping pattern representing the at least one symbol, the frequency of the subcarrier wave to one of a plurality of different hopping frequencies that represent the plurality of different symbol values, respectively, the one hopping frequency representing one of the different symbol values that is actually represented by the at least one symbol.

The explanations provided for the transponder according to the mode (9) can apply to the transponder according to this mode (10).

(11) The transponder according to any of the modes (2) through (4), (6), (8), and (9), wherein the first and second portions of the information signal comprise a plurality of common bits, wherein the subcarrier wave modulator modulates, according to each of the plurality of common bits, a corresponding one of a plurality of portions of the subcarrier wave such that the each common bit is carried by the modulated one portion of the subcarrier wave, and wherein the frequency hopping device hops, according to the frequency hopping pattern representing the plurality of common bits, the frequency of each of the plurality of portions of the subcarrier wave to a corresponding one of a plurality of hopping frequencies that represent the plurality of common bits, respectively, such that the each common bit carried by the modulated one portion of the subcarrier wave that has one of the plurality of hopping frequencies differs from the common bit represented by the one of the plurality of hopping frequencies.

In the case where the common bits comprise the transmission information, the transmission information has redundancy and accordingly the interrogator can easily restore the transmission information even if one or more errors may occur to the transmission of one of the first and second portions of the information signal.

(12) The transponder according to any of the modes (2), (3), (5), (7), and (10), wherein the first and second portions of the information signal comprise a plurality of common symbols, wherein the subcarrier wave modulator modulates, according to each of the plurality of common symbols, a corresponding one of a plurality of portions of the subcarrier wave such that the each common symbol is carried by the modulated one portion of the subcarrier wave, and wherein the frequency hopping device hops, according to the frequency hopping pattern representing the plurality of common symbols, the frequency of each of the plurality of portions of the subcarrier wave to a corresponding one of a plurality of hopping frequencies that represent the plurality of common symbols, respectively, such that the each common symbol carried by the modulated one portion of the subcarrier wave that has one of the plurality of hopping frequencies differs from the common symbol represented by the one of the plurality of hopping frequencies.

The explanations provided for the transponder according to the mode (11) can apply to the transponder according to this mode (12).

(13) The transponder according to the mode (11), wherein the frequency hopping pattern defines an initial hopping frequency representing at least a portion of an identification code identifying the transponder, and additionally defines, subsequent to the initial hopping frequency, the plurality of hopping frequencies respectively representing the plurality of common bits common to the plurality of bits carried by the modulated subcarrier wave, wherein the subcarrier wave modulator modulates, according to an initial one of the plurality of common bits, an initial one of the plurality of portions of the subcarrier wave such that the initial common bit is carried by the modulated initial portion of the subcarrier wave, and subsequently modulates, according to subsequent ones of the plurality of common bits, subsequent ones of the plurality of portions of the subcarrier wave such that the subsequent common bits are carried by the modulated subsequent portions of the subcarrier wave, respectively, and wherein the frequency hopping device hops, according to the frequency hopping pattern, the frequency of the initial portion of the subcarrier wave to the initial hopping frequency such that the initial common bit is carried by the modulated initial portion of the subcarrier wave that has the initial hopping frequency, and subsequently hops the frequency of each of the subsequent portions of the subcarrier wave to a corresponding one of the plurality of hopping frequencies respectively representing the plurality of common bits, such that the subsequent common bits are respectively carried by the modulated subsequent portions of the subcarrier wave that respectively have the plurality of hopping frequencies respectively representing the plurality of common bits.

(14) The transponder according to any of the modes (2) through (13), wherein the subcarrier wave modulator modulates the subcarrier wave according to the second portion of the information signal, the second portion comprising at least one frame data that is usable to identify the transponder as a first transponder in distinction from a second transponder of the communication system.

A frame data is defined as a set of data that is carried by at least a portion of the subcarrier wave that has a single hopping frequency of the frequency hopping pattern.

(15) The transponder according to the mode (14), wherein the at last one frame data comprises a portion of an identification code that identifies the transponder as the first transponder in distinction from the second transponder.

For example, in the case where the ID code of the transponder consists of eight bits (e.g., (11010100)), the frame data may comprise a portion of the ID code (e.g., (0100), i.e., right-hand four bit values of the eight-bit ID code). According to this mode, the amount of data contained by each frame data can be reduced and accordingly the amount of occurrence of errors can be also reduced.

(16) The transponder according to the mode (14), further comprising a random number generator which generates a random number, wherein the at least one frame data comprises the random number generated by the random number generator.

In the case where the interrogator receives a plurality of frame data each of which comprises a common random number, the interrogator can recognize that all those frame data have been transmitted from the same and one transponder, because, if a plurality of transponders generates respective random numbers, the probability that two of those random numbers coincide with each other is very small. In this case, the frequency hopping pattern may represent an ID code of the transponder, so that the interrogator may recognize the ID code of the transponder from the frequency hopping pattern. According to this mode, the amount of data contained by each frame data can be reduced, and the interference of hopping frequencies is unlikely to occur and therefore the amount of occurrence of errors can be reduced.

(17) The transponder according to any of the modes (4), (6), (8), (9), (11), (13), and (14) through (16), wherein the unit data consists of the at least one bit that can represent an arbitrary one of two different bit values, and wherein the frequency hopping device hops the frequency of the subcarrier wave according to one of two predetermined frequency hopping patterns each of which comprises a combination of (a) a plurality of hopping frequencies and (b) a plurality of timings when the frequency of the subcarrier wave is hopped to the plurality of hopping frequencies, respectively, the one frequency hopping pattern representing one of the two different bit values that is actually represented by the at least one bit.

This mode (17) is effective in particular when a great number of hopping frequencies cannot be used.

(18) The transponder according to any of the modes (5), (7), (10), (12), and (14) through (16), wherein the unit data consists of the at least one symbol that can represent an arbitrary one of a plurality of different symbol values, and wherein the frequency hopping device hops the frequency of the subcarrier wave according to one of a plurality of predetermined frequency hopping patterns each of which comprises a combination of (a) a plurality of hopping frequencies and (b) a plurality of timings when the frequency of the subcarrier wave is hopped to the plurality of hopping frequencies, respectively, the one frequency hopping pattern representing one of the different symbol values that is actually represented by the at least one symbol.

The explanation provided for the transponder according to the mode (17) can apply to the transponder according to the mode (18). In addition, a long ID code of the transponder may be represented by each predetermined frequency hopping pattern.

(19) The transponder according to any of the modes (4), (6), (8), (9), (11), (13), and (14) through (17), wherein the unit data consists of the at least one bit that can represent an arbitrary one of two different bit values, and wherein the frequency hopping device hops the frequency of the subcarrier wave according to the frequency hopping pattern comprising a combination of (a) at least one hopping frequency and (b) at least one pair of time slots that represent the two different bit values, respectively.

According to this mode (19), even if a great number of hopping frequencies cannot be used, the interrogator can distinguish the transponder from another or other transponders, based on the frequency hopping pattern.

(20) The transponder according to any of the modes (5), (7), (10), (12), (14) through (16), and (18), wherein the unit data consists of the at least one symbol that can represent an arbitrary one of a plurality of different symbol values, and wherein the frequency hopping device hops the frequency of the subcarrier wave according to the frequency hopping pattern comprising a combination of (a) at least one hopping frequency and (b) at least one group of time slots that represent the different symbol values, respectively.

The explanation provided for the transponder according to the mode (19) can apply to the transponder according to the mode (20).

(21) An interrogator for use in a communication system including, in addition to the interrogator, a transponder, the interrogator transmitting a carrier wave to the transponder so that the transponder receives the carrier wave, modulates the received carrier wave based on a subcarrier wave modified according to a frequency hopping pattern, and returns the modulated carrier wave as a reflected wave to the interrogator, the interrogator comprising a carrier wave transmitter which transmits the carrier wave to the transponder; a reflected wave receiver which receives, as the reflected wave returned from the transponder, the carrier wave modulated based on the subcarrier wave modified according to the frequency hopping pattern; a demodulator which demodulates the reflected wave received by the reflected wave receiver, into a demodulated signal; a frame-data obtaining device which obtains, from the demodulated signal, at least one frame data; a frequency hopping pattern recognizer which recognizes, from the demodulated signal, the frequency hopping pattern; and an information obtaining device which obtains, from the at least one frame data obtained by the frame-data obtaining device and the frequency hopping pattern recognized by the frequency hopping pattern recognizer, identification information usable to identify the transponder, and transmission information transmitted with the identification information from the transponder to the interrogator.

Since the reflected wave receiver can simultaneously receive the carrier wave over the entire frequency range in which the subcarrier wave is hopped, the frequency hopping pattern recognizer can accurately recognize the frequency hopping pattern. According to this mode (21), the interrogator can appropriately respond to a quick frequency hopping operation of the transponder.

(22) A communication system, comprising at least one interrogator according to any one of the modes (1) through (20); and at least one transponder according to the mode (21).

According to this mode (22), the interrogator can reliably distinguish the reflected wave returned from the transponder, from another or other reflected waves returned from another or other transponders.

(23) The communication system according to the mode (22), comprising a plurality of the interrogators each according to any one of the modes (1) through (20) and a plurality of the transponders each according to the mode (21), wherein each one of the plurality of interrogators can identify each one of the plurality of transponders in distinction from the other transponders.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which:

FIG. 4A is a diagrammatic view showing an electric arrangement of each transponder 20, 21, 22;

FIG. 5A is a graph showing an information signal used by the transponder 20;

FIG. 5B is a graph showing a modulated subcarrier wave fs1 produced by the transponder 20:

FIG. 5C is a graph showing an information signal used by the transponder 21;

FIG. 5D is a graph showing a modulated subcarrier wave fs2 produced by the transponder 21:

FIG. 5E is a graph showing respective frequencies of the subcarrier waves fs1, fs2;

FIG. 5F is a graph showing respective frequencies of the reflected waves f1 (FC1+fs1), f2(FC1+fs2);

FIG. 5G is a graph showing the subcarrier waves fs1, fs2 outputted through channels, CH1, CH2, CH3, . . . ;

FIG. 5H is a graph showing the modulated subcarrier wave fs1 received from the transponder 20;

FIG. 5I is a graph showing the modulated subcarrier wave fs2 received from the transponder 21;

FIG. 5J is a graph showing the demodulated, original information signal transmitted from the transponder 20;

FIG. 5K is a graph showing the demodulated, original information signal transmitted from the transponder 21;

FIG. 6 is a view showing a predetermined relationship between channel and hopping frequency; and a predetermined relationship between (A) hopping frequency and (B) (b1) right-hand two bit values of four-bit identification (ID) code of transponder and (b2) bit value represented by each bit of four-bit transmission data;

FIG. 7 is a view showing a modified relationship between channel and hopping frequency;

FIG. 8 is a view showing a predetermined relationship between (A) hopping frequency and (B) (b1) four-bit ID code of transponder and (b2) bit value represented by each bit of four-bit transmission data;

FIGS. 9A, 9B, 9C, 9D, 9E, and 9F are views showing respective predetermined frequency hopping patterns that represent respective predetermined four-bit codes, respectively; and FIG. 10 is a view showing a predetermined relationship between (A) hopping frequency and (B) (b1) four-bit ID code of transponder and (b2) bit value represented by each bit of four-bit transmission data.

DETAILED DESCRIPTION OF THE PREFERRED EMBODIMENTS

Figure 1:
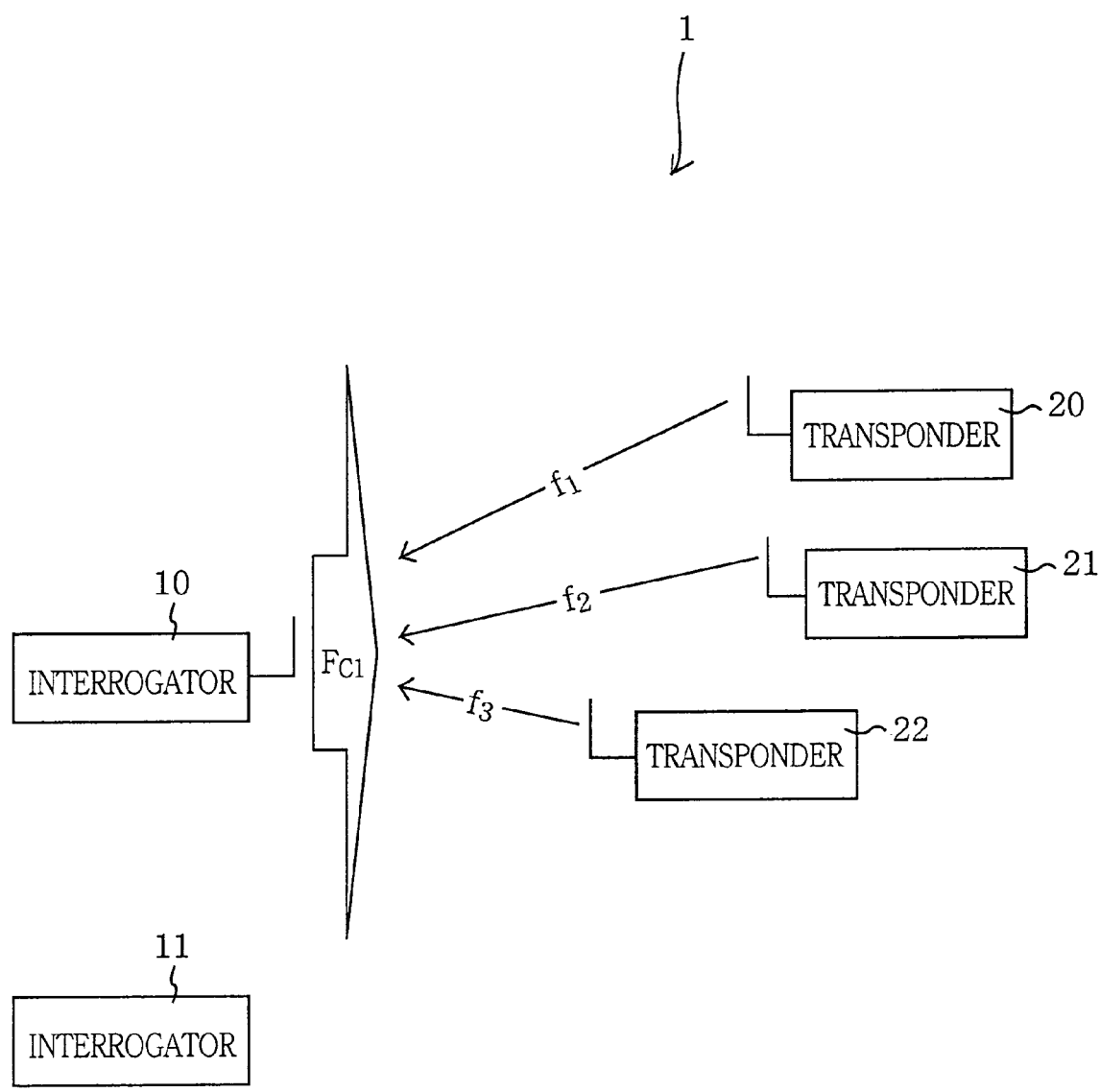
FIG. 1 is an illustrative view showing a communication system 1 to which the present invention is applied and which includes interrogators 10, 11 and transponders 20, 21, 22 to which the present invention is also applied.
Figure 2:
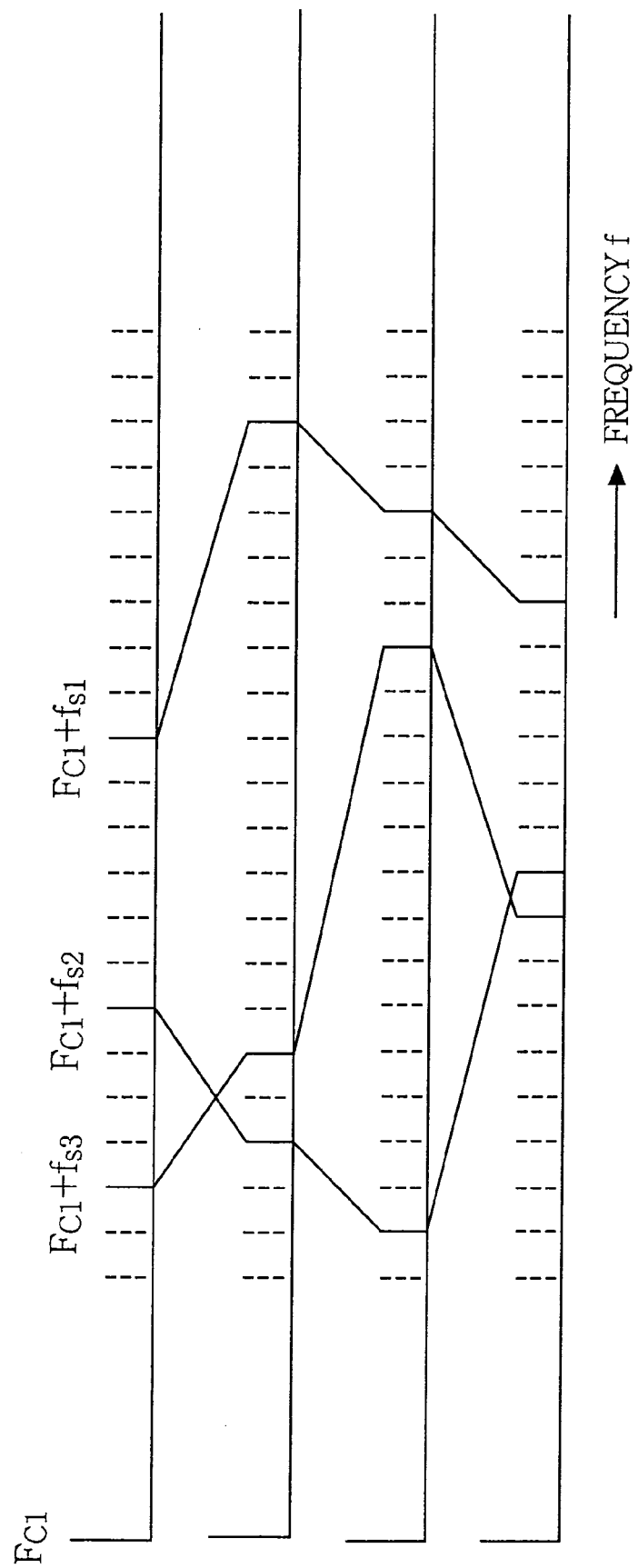
FIG. 2 is a graph showing a basic relationship between a carrier wave and reflected waves that is used in the communication system 1.

Hereinafter, there will be described a wireless communication system 1 embodying the present invention, by reference to the drawings. FIG. 1 shows an arrangement of the communication system 1; and FIG. 2 shows a relationship between a carrier wave and reflected waves that is used in the communication system 1.

As shown in FIG. 1, the communication system 1 includes two interrogators 10, 11 and three transponders 20, 21, 22. The interrogator 10 transmits a carrier wave, FC1, to each of the transponders 20–22. The transponder 20 returns a reflected wave, f1, to the interrogator 10; and the other transponders 21, 22 return respective reflected waves, f2, f3, to the same 10. The following descriptions of the interrogator 10 also apply to the interrogator 11.

More specifically described, the three transponders 20–22 subject respective received carrier waves FC1 to respective secondary modulations using respective subcarrier waves, fs1, fs2, fs3, that have been subjected to respective primary modulations using respective information signals ("data") representing, e.g., respective identification codes of the transponders 20–22, and return the thus modulated carrier waves as the reflected waves f1, f2, f3 to the interrogator 10. As shown in FIG. 2, respective frequencies of the subcarrier waves fs1–fs3 corresponding to the reflected waves f1–f3 returned from the transponders 20–22 are hopped in different manners. As shown in the figure, upper and lower sideband signals, FC1±fs1, FC1±fs2, FC1±fs3, (the lower sideband signals are not shown) fall in a signal-reception frequency band of the interrogator 10. However, the probability that those sideband signals interfere with each other is very small because the frequencies of the sideband signals are hopping. Thus, the interrogator 10 can selectively obtain the particular information signal transmitted from each one of the transponders 20, 21, 22.

Figure 3:
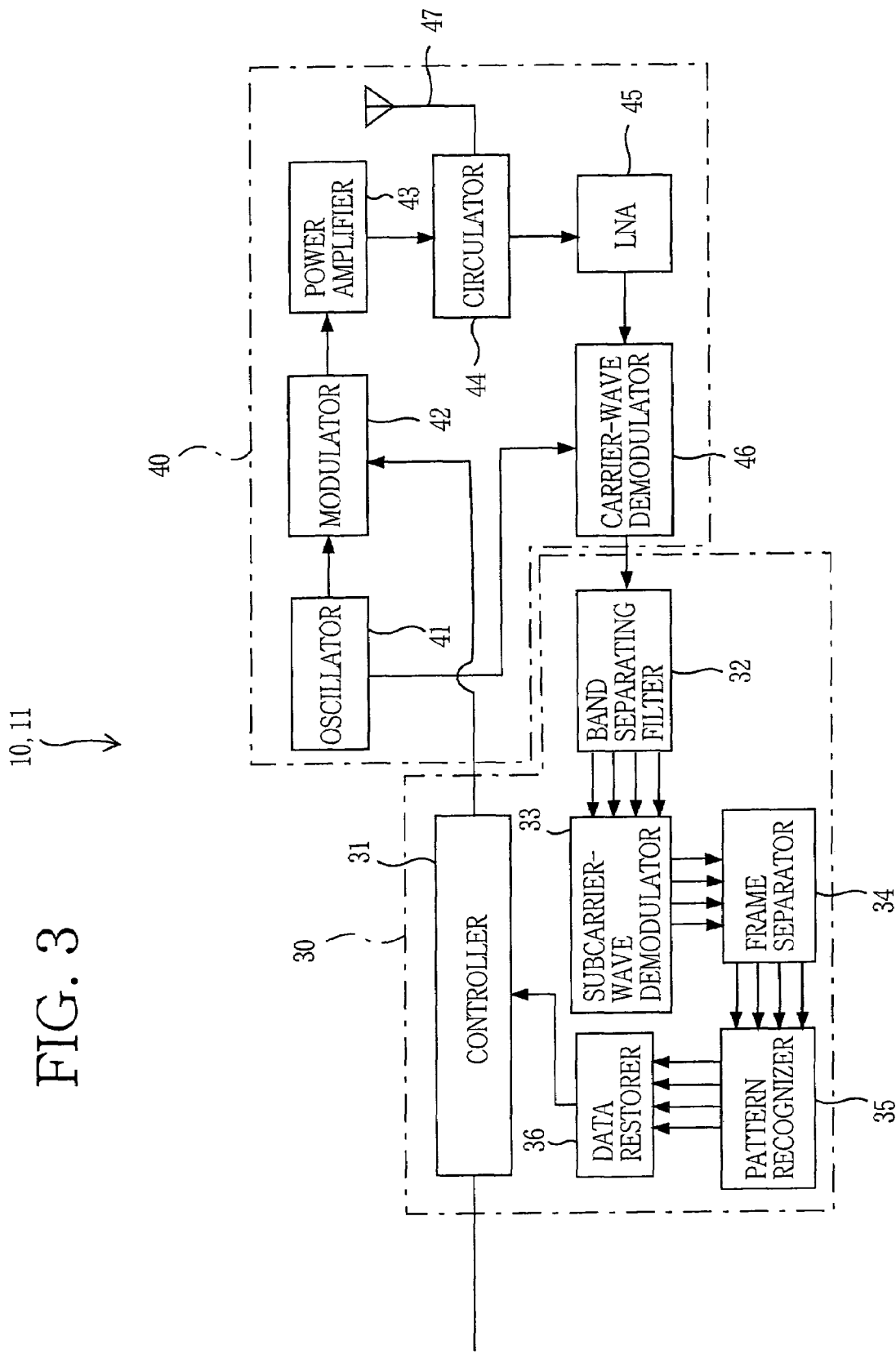
FIG. 3 is a diagrammatic view showing an electric arrangement of each interrogator 10, 11.

Next, an electric arrangement of the interrogator 10 will be described by reference to FIG. 3. As shown in the figure, the interrogator 10 includes a digital circuit portion 30 and an analog circuit portion 40. The analog circuit portion 40 includes an oscillator 41 that can oscillate various carrier waves having respective different frequencies, for example, 900 MHz, 2.4 GHz, and 5 GHz; a modulator 42 that modulates, as needed, each carrier wave generated by the oscillator 41, using ASK (amplitude shift keying) modulation, so that the modulated carrier wave represents, e.g., an identification code of the interrogator 10 and/or frequency hopping timings; a power amplifier 43 that amplifies the electric power of the carrier wave modulated by the modulator 42; a circulator 44 that separates input and output signals from each other, so that the output signal, i.e., the output of the power amplifier 43 is sent to an antenna 47 and the input signal, i.e., an electric wave received by the antenna 47 is sent to a low noise amplifier (hereinafter, referred to as the "LNA") 45; the LNA 45 that amplifies the respective input signals received by the antenna 47 from the three transponders 20–22; and a carrier-wave demodulator 46 that mixes the input signals (i.e., the reflected waves f1–f3 or the modulated carrier waves) amplified by the LNA 45, with the carrier wave generated by the oscillator 41, i.e., subjects the input signals to homodyne detection, thereby producing demodulated signals, i.e., modulated subcarrier waves fs1–fs3.

The digital circuit portion 30 includes a band separating filter 32 that digitizes the demodulated signals (i.e., analog signals) that have been subjected to the homodyne detection by the carrier wave demodulator 46, and subsequently subjects the digitized demodulated signals to a filtering treatment so that the demodulated signals, i.e., the modulated subcarrier waves fs1–fs3 are separated into respective portions that are outputted through a plurality of channels corresponding to a plurality of hopping frequencies; a subcarrier-wave demodulator 33 that demodulates the separated portions of the modulated subcarrier waves fs1–fs3 provided by the band separating filter 32 and reproduces the corresponding portions of the original information signals; a frame separator 34 that separates the output of each of the channels, provided by the subcarrier-wave demodulator 33, into respective appropriate frames; a pattern recognizer 35 that sorts the frames provided by the frame separator 34, into respective groups of frames corresponding to the three transponders 20–22; a data restorer 36 that connects, for each of the transponders 20–22, the corresponding group of frames to each other in time sequence, and thereby obtaining the original information signal ("data") transmitted from the each transponder 20–22; and a controller 31 that controls the overall operations of the interrogator 10. The original information signal ("data") thus obtained for each of the transponders 20–22, i.e., the corresponding group of frames connected to each other in time sequence by the data restorer 36, is inputted to the controller 31.

Next, there will be described a construction of each of the transponders 20, 21, 22, by reference to FIG. 4A. As shown in the figure, the transponder 20 includes an antenna 61, a modulator demodulator 60 connected to the antenna 61, and a digital circuit portion 50. The digital circuit portion 50 includes a controller 51 that controls the overall operations of the transponder 20; a subcarrier-wave oscillator 53 that oscillates or generates the subcarrier wave fs1 while hopping the frequency of the subcarrier wave according to a frequency hopping pattern, described later, under control of the controller 51; and a subcarrier-wave modulator 52 that modulates the subcarrier wave fs1 generated by the subcarrier-wave oscillator 53, using PSK (phase shift keying) modulation, so that the modulated subcarrier wave fs1 represents the original information signal inputted to the modulator 52 via the controller 51. The subcarrier wave fs1 modulated by the subcarrier-wave modulator 52 is inputted to the modulator demodulator 60, so as to be used to modulate the carrier wave FC1 received from the interrogator 10. The thus modulated carrier wave is returned as the reflected wave f1 from the antenna 61. However, each of the subcarrier-wave oscillator 53 and the subcarrier-wave modulator 52 may be replaced with a software program that utilizes a clock of the controller 51. In addition, the subcarrier wave fs1 may be modulated using a different method, e.g., FSK (frequency shift keying) modulation or QPSK (quadriphase shift keying) modulation. Moreover, the subcarrier-wave oscillator 53 and the subcarrier-wave modulator 52 may be integrated with the controller 51 and may be provided in the form of one chip. The other transponders 21, 22 have an identical arrangement as the above-described arrangement of the transponder 20.

Figure 4B:
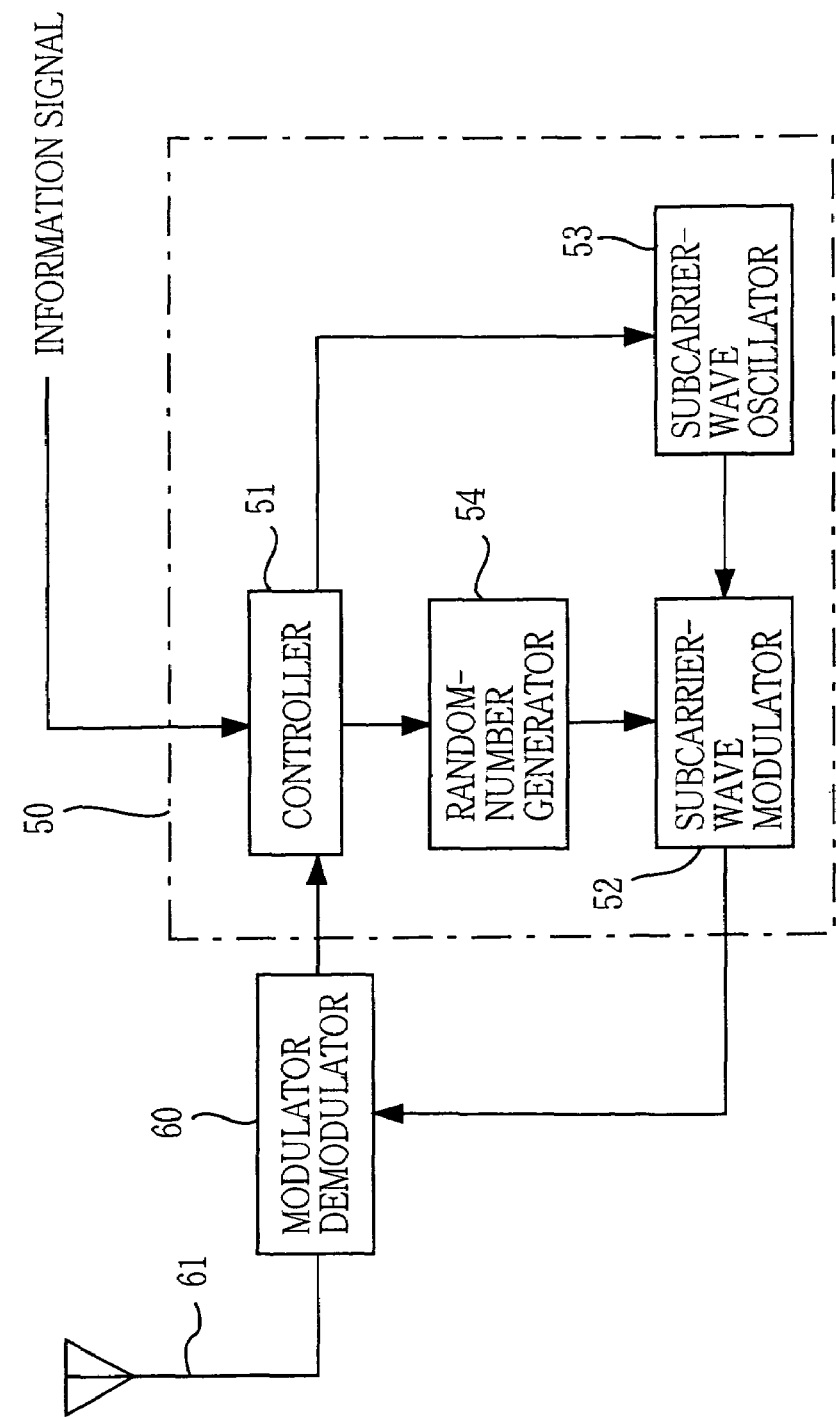
FIG. 4B is a diagrammatic view showing an electric arrangement of another transponder as another embodiment of the present invention.

Each of the three transponders 20, 21, 22 may additionally employ a random number generator or generating circuit 54, as shown in FIG. 4B, so that the subcarrier-wave modulator 52 modulates the subcarrier wave fs1–fs3 based on a random number generated by the generator 54.

Next, the operation of the communication system 1 constructed as described above will be described by reference to FIGS. 5A through 5K and FIG. 6. FIGS. 5A through 5K show information signals, signal frequencies, and frequency channels that are used by respective portions of the interrogator 10 and each transponder 20–22; and FIG. 6 shows a predetermined relationship between channel and hopping frequency; and a predetermined relationship between (A) hopping frequency and (B) (b1) right-hand two bit values of four-bit ID (identification) code of transponder and (b2) bit value represented by each bit of four-bit transmission data. Those relationships are known, in advance, to the interrogator 10.

First, in the interrogator 10, the oscillator 41 oscillates a carrier wave FC1 having a frequency of, e.g., 900 MHz, 2.4 GHz, or 5 GHz. The carrier wave FC1 produced by the oscillator 41 is subjected, as needed, by the modulator 42 under control of the controller 31, to ASK modulation using information representing, e.g., the ID code of the interrogator 10 and/or frequency hopping timings. The thus modulated carrier wave FC1 is transmitted from the antenna 47 via the circulator 44.

When the transponder 20 receives the carrier wave FC1 transmitted from the interrogator 10, the subcarrier-wave modulator 52 of the transponder 20 phase-modulates, using an information signal, shown in FIG. 5A, the subcarrier wave generated by the subcarrier-wave oscillator 53, and thereby produces a phase-modulated subcarrier wave fs1, shown in FIG. 5B, that in turn is applied to the modulator demodulator 60.

Likewise, when the transponder 21 receives the carrier wave FC1 transmitted from the interrogator 10, the subcarrier-wave modulator 52 of the transponder 21 phase-modulates, using an information signal, shown in FIG. 5C, the subcarrier wave generated by the subcarrier-wave oscillator 53, and thereby produces a phase-modulated subcarrier wave fs2, shown in FIG. 5D, that in turn is applied to the modulator demodulator 60.

The subcarrier waves fs1, fs2 have respective frequencies shown in the graph of FIG. 5E in which the axis of abscissa indicates frequency, f, and the origin of the axis indicates a baseband frequency, f=0. Subsequently, in the transponders 20, 21, the modulator demodulators 60 amplitude-modulate or phase-modulate, using the subcarrier wave fs1, fs2, the received carrier waves FC1 and emit the modulated carrier waves as the reflected waves f1, f2 (FIG. 1) from the antennas 61. The electric waves emitted from the antennas 61 have a spectrum shown in the graph of FIG. 5F in which, however, only the upper sidebands relative to the carrier wave FC1 are shown and the lower sidebands are not shown. More specifically explained, in the graph of FIG. 5F, FC1 represents the carrier wave transmitted from the interrogator 10; FC1+fs1 represents the reflected wave f1 returned from the transponder 20; and FC1+fs2 represents the reflected wave f2 returned from the transponder 21.

Subsequently, when the interrogator 10 receives the input signals returned from the transponders 20, 21, the received signals are sent via the circulator 44 to the LNA 45, subsequently are amplified by the LNA 45, and then are mixed, by the carrier-wave demodulator 46, with the signal produced by the oscillator 41 so that the received signal is subjected to the homodyne detection. The signal-reception frequency band of the interrogator 10 is so selected as to cover the sidebands of the highest one of the hopping frequencies, but not to cover a frequency of any other carrier wave. If the signal-reception frequency band covers the frequency of different carrier wave, the magnitude of the reflected waves f1, f2 that have been modulated by the transponders 20, 21 is relatively lowered and accordingly an S/N ratio, or a signal to interference ratio, of each of the reflected waves f1, f2 is lowered, because the magnitude of carrier wave is much greater than that of reflected wave.

The homodyne detection results in producing demodulated signals, as shown in FIG. 5G, that are a mixture of the subcarrier wave fs1 of the reflected wave f1 returned from the transponder 20 and the subcarrier wave fs2 of the reflected wave f2 returned from the transponder 21. The mixture signals are converted into digital values by an A/D converter (not shown) incorporated by the band separating filter 32, and the subcarrier wave fs1 of the reflected wave f1 from the transponder 20 and the subcarrier wave fs2 of the reflected wave f2 from the transponder 21 are simultaneously subjected, by the band separating filter 32, to a filtering treatment using Fourier transformation, so as to be separated into the channels (CH1, CH2, CH3, . . . ) corresponding to the hopping frequencies. If each of the thus separated portions of the mixture signals are converted into time sequence, using inverse Fourier transformation, the subcarrier wave fs1 of the reflected wave f1 from the transponder 20 is eventually obtained as a modulated subcarrier wave, as shown in FIG. 5H; and the subcarrier wave fs2 of the reflected wave f2 from the transponder 21 is eventually obtained as a modulated subcarrier wave, as shown in FIG. 5I. In fact, however, a series of digital values corresponding to each of the modulated subcarrier waves fs1, fs2 shown in FIGS. 5H and 5I is obtained.

The modulator 42 of the interrogator 10 may be adapted to modulate, using ASK modulation, frequency-hopping-timing signals on the carrier wave FC1, so that the thus modulated carrier wave FC1 is transmitted to each of the transponders 20, 21. In this case, each time each transponder 20, 21 receives one frequency-hopping-timing signal carried by the carrier wave FC1, the each transponder 20, 21 performs one frequency hopping action, i.e., hops the frequency of subcarrier wave to an appropriate hopping frequency. After the reflected waves f1, f2 received by the interrogator 10 from the transponders 20, 21 are subjected to the homodyne detection by the carrier-wave demodulator 46, the thus demodulated waves are converted into digital values. If the thus obtained digital values are separated into respective blocks corresponding to the frequency hopping timings and the thus obtained blocks are subjected to Fourier transformation and then inverse Fourier transformation, a frame separating operation of the interrogator 10, described later, can be easily carried out.

Since the frequency of each of a plurality of different portions of each subcarrier wave fs1, fs2 is hopped to a corresponding one of a plurality of different hopping frequencies according to a frequency hopping pattern, those different portions of the subcarrier wave are outputted through different channels corresponding to those hopping frequencies. Therefore, if the subcarrier-wave demodulator 33 demodulates each of those different portions of the subcarrier wave fs1, fs2 outputted through the different channels, the original information signal can be eventually restored. More specifically described, regarding the reflected wave f1 returned from the transponder 20, an information signal, as shown in FIG. 5J, is obtained from the modulated subcarrier wave fs1 shown in FIG. 5H; and regarding the reflected wave f2 returned from the transponder 21, an information signal, as shown in FIG. 5K, is obtained from the modulated subcarrier wave fs2 shown in FIG. 5I.

Since the different channels output the different portions of each information signal that correspond to the different portions of the corresponding subcarrier wave fs1, fs2 that have the different hopping frequencies, the frame separator 34 can separate the output of each of the channels into respective frames each of which has been carried by a single portion of a subcarrier wave that has a single hopping frequency, and can obtain respective sets of data contained by the respective frames (hereinafter, referred to as "the frame data"). The pattern recognizer 35 recognizes the frequency hopping pattern based on the respective outputs of the channels and the respective frame data. Finally, the data restorer 36 utilizes the thus recognized frequency hopping pattern and the obtained frame data, for restoring or reproducing the original information signal (i.e., "data"), and inputs the thus reproduced information signal to the controller 31.

Next, the respective outputs of the channels that correspond to each of the reflected waves f1, f2 received from the transponders 20, 21 will be explained by reference to FIG. 6. In the figure, for example, "CH1" indicates Channel 1, . . . and "CH16" indicates Channel 16; "h1" indicates a first hopping frequency, . . . and "h16" indicates a sixteenth hopping frequency; and a four-figure number contained in each rectangle indicates an ID code of a transponder as a sort of identification information that is usable to identify each of the transponders 20, 21 in distinction from the other transponders. In an example shown in FIG. 6, the ID code of each transponder 20, 21 consists of four bits; and each smallest transmission data, i.e., each unit data also consists of four bits. Thus, in the example shown in FIG. 6, each transponder 20, 21 hops the frequency of subcarrier wave the same total number of times (i.e., four times) as the total number (i.e., four) of the bits of each transmission data.

In the example shown in FIG. 6, an initial hopping frequency defined by a frequency hopping pattern used by each transponder 20, 21 represents right-hand two bit values of the four-bit ID code of the each transponder 20, 21, and additionally represents an initial bit value of the four-bit transmission data transmitted from the each transponder 20, 21 to the interrogator 10. Since right-hand two bit values of a four-bit ID code, (0100), of the transponder 20 are (00), the initial hopping frequency defined by the frequency hopping pattern is selected at h1 or h2. In addition, since the initial bit value of the four-bit transmission data is (0), the initial hopping frequency is selected at h1. On the other hand, if the initial bit value is (1), then the initial hopping frequency is selected at h2. Likewise, the second hopping frequency following the initial hopping frequency, defined by the frequency hopping pattern, is selected at h3 or h4 depending upon the second bit value (0) or (1) of the four-bit transmission data following the initial bit value. Thus, the frequency hopping pattern defines the hopping frequencies in the order of h1 or h2→h3 or h4→h5 or h6→h7 or h8. The interrogator 10 detects or recognizes an actual frequency hopping pattern that defines actual hopping frequencies in the order of h1→h3→h6→h7, and accordingly restores the right-hand two bit values (00) of the four-bit ID code (0100) and the four-bit transmission data, i.e., the unit data (0010).

Since a four-bit ID code of the transponder 21 is (1011), an initial hopping frequency defined by a frequency hopping pattern used by the transponder 21 is selected at h7 or h8. If the frequency hopping pattern defines four hopping frequencies in the order of h8→h10→h11→h14, the interrogator 10 restores right-hand two bit values (11) of the four-bit ID code (1011) and four-bit transmission data (1101) transmitted from the transponder 21 to the interrogator 10. Since each transponder 20, 21 iteratively transmits its ID code with each of the hopping frequencies, the interrogator 10 can easily identify an error that may occur to one or more of the hopping frequencies. Since the reflected waves f1, f2 returned from the transponders 20, 21 are weak, errors are likely to occur when the reflected waves are demodulated. According to the present method, however, the interrogator 10 can restore data, without having to demodulate a corresponding portion of each reflected wave f1, f2, so long as the interrogator 10 can identify which hopping frequency the corresponding portion of the subcarrier wave fs1, fs2 of the each reflected wave f1, f2 has, for example, h3 or h4. Thus, the interrogator 10 can enjoy a very high signal-reception reliability. Heretofore, the frequency hopping pattern has been explained as defining the hopping frequencies in the order of the numbers suffixed to the symbols "h", i.e., in the order of h1, h2, h3, . . . . However, in fact, since the hopping frequencies of the frequency hopping pattern are assigned, at random, to the channels, respectively, actual hopping frequencies are outputted at random through the corresponding channels. Since a time duration in which each frame data is transmitted with a specific hopping frequency is very short, the probability that the frame data having the specific hopping frequency interferes with a subcarrier wave returned from another transponder is very small.

In the example shown in FIG. 6, there are a plurality of initial hopping frequencies that correspond to the right-hand two bit values of the four-bit ID code of each transponder 20, 21. For example, the hopping frequencies h1, h9, . . . correspond to the right-hand two bit values (00) of the four-bit ID code of the transponder 20. Therefore, each transponder 20, 21 randomly selects an appropriate one of the different initial hopping frequencies. Thus, the above probability is further decreased.

The above explanations relate to the case where each smallest transmission data, i.e., each unit data consists of four bits. However, the explanations also apply to the cases where each unit data consists of, e.g., eight bits or sixteen bits.

In the example shown in FIG. 6, each frame data consists of the entirety of four-bit ID code of each transponder 20, 21. However, an ID code of each transponder 20, 21 consists of more than four bits, e.g., eight bits, each frame data may consist of a portion of the eight-bit ID code, i.e., right-hand four bit values of the eight-bit ID code. For example, in the case where the respective ID codes of the transponders 20, 21 are (11010100) and (11011011), respectively, each frame data may consist of (0100) or (1011).

FIG. 7 shows a modified relationship between channel and hopping frequency. In this case, each transponder 20, 21 uses a frequency hopping pattern defining one or more pairs of hopping frequencies that correspond to one or more pairs of odd-number and even-number channels, such that a hopping frequency corresponding to an odd-number channel represents a bit value (0), and a hopping frequency corresponding to an even-number channel represents a bit value (1). In this case, too, each transponder 20, 21 hops the frequency of subcarrier wave the same number of times as the number of the bits of each transmission data.

Each smallest transmission data, i.e., each unit data may consist of one bit. For example, in the case where a sensor or a switch incorporates the transponder 20, the transponder 20 may transmit its own ID code with a hopping frequency corresponding to an odd-number channel and representing its ON state or a hopping frequency corresponding to an even-number channel and representing its OFF state. In this case, the interrogator 10 can easily recognize the current state of the sensor or switch, by just identifying which one of the odd-number and even-number channels has outputted the ID code of the transponder 20.

In addition, each transponder 20, 21 may transmit, as each frame data, information other than its own ID code, so long as the interrogator 10 can identify the each transponder in distinction from the other transponders. Even in the case where the ID code of each transponder 20, 21 consists of more than four bits, the each transponder may transmit, as each frame data, the ID code as it is.

In the modified embodiment shown in FIG. 4B, the random-number generator 54 of each modified transponder may generate a four-bit random number, and the each transponder may transmit, as each frame data, the random number generated by the generator 54. In this case, the each transponder may employ a frequency hopping pattern defining a plurality of hopping frequencies representing both its own ID code and the smallest transmission data, and may sequentially transmit a batch of transmission data consisting of a plurality of sets of smallest data, by iteratively using the frequency hopping pattern.

FIG. 8 shows another predetermined relationship between (A) hopping frequency and (B) (b1) four-bit ID code of transponder and (b2) bit value represented by each bit of four-bit transmission data. Those relationships are known, in advance, to the interrogator 10. As shown in the figure, if a four-bit ID code of the transponder 20 (or 21 or 22) is (0010), an initial hopping frequency defined by a frequency hopping pattern used by the transponder 20 is selected at h3. In the second embodiment shown in FIG. 8, the initial hopping frequency represents only the four-bit ID code of the transponder 20. The hopping frequencies h1, h2, . . . represent respective four-bit ID codes of transponders. Since the initial hopping frequency is h3, the frequency hopping pattern defines the second and following hopping frequencies in the order of h5 or h6→h7 or h8→h9 or h10→h11 or h12. Each hopping frequency whose number suffixed to the symbol "h" is an odd number represents a bit value (0), and each hopping frequency whose number suffixed to the symbol "h" is an even number represents a bit value (1). The transponder 20 transmits, with the initial hopping frequency h3, a bit value (0) represented by a bit as the next (in this case, the initial) frame data and additionally represented by the next (in this case, second) hopping frequency defined by the frequency hopping pattern. In the example shown in FIG. 8, the transponder 20 transmits, with the hopping frequency h5, a bit value (1) represented by a bit as the next (in this case, the second) frame data and additionally represented by the next (in this case, third) hopping frequency of the frequency hopping pattern. Although the transponder 20 actually transmits, with the hopping frequency h8, a bit value (0) represented by a bit as the next (in this case, the third) frame data and additionally represented by the next (in this case, fourth) hopping frequency of the frequency hopping pattern, the interrogator 10 observes, in addition to the subcarrier wave having the frequency h8, a subcarrier wave having a frequency h7 resulting from noise. In this case, however, since the hopping frequency h5 has been used to transmit the bit value (1), the interrogator 10 can identify that the frequency h7 has resulted from noise and the frequency h8 representing the bit value (1) is a correct hopping frequency. Thus, in this embodiment, the four hopping frequencies of the frequency hopping pattern, except for the initial hopping frequency, and the four frame data represent four bits (0101). That is, the transponder 20 modulates, according to each of the four bits as the four frame data, a corresponding one of four portions of the subcarrier wave such that the each bit is carried by the modulated one portion of the subcarrier wave, and additionally the transponder 20 hops, according to the frequency hopping pattern, the frequency of each of the four portions of the subcarrier wave to a corresponding one of the four hopping frequencies respectively representing to the four bits, such that the each bit carried by the modulated one portion of the subcarrier wave that has one of the four hopping frequencies differs from the bit represented by to the one hopping frequency. Therefore, even if an error occurs to one or more of the hopping frequencies, the interrogator 10 can compensate for the error. According to this method, the interrogator 10 can easily restore all the common bits with the least possibility of occurrence of error.

Each frame data may represent a bit value (0) or (1), such that if a phase inversion is present in the frame data, the frame data represents the bit value (0) and, if not, it represents the bit value (1). Alternatively, each frame data may represent a bit value (0) or (1), depending upon a total number of phase inversions present in the frame data (since an inversion period is known to the interrogator 10, a pulse-like inversion resulting from noise is not counted).

FIGS. 9A through 9F show respective predetermined frequency hopping patterns each of which is a combination of four hopping frequencies h1, h2, h3, h4 and four timings t1, t2, t3, t4 at each of which the frequency of subcarrier wave is hopped to an appropriate one of the four hopping frequencies h1, h2, h3, h4. The predetermined frequency hopping patterns shown in FIGS. 9A–9F represent respective four-bit codes. In this case, each transponder 20, 21 may transmit, as each frame data, its own ID code. Alternatively, like the second embodiment shown in FIG. 8, an initial hopping frequency of each of the predetermined frequency hopping patterns used by each transponder 20, 21 may represent an ID code of the each transponder. If one of the amount of data of an ID code of each transponder 20, 21 and the amount of data of transmission data to be transmitted with the ID code from the each transponder to the interrogator 10 is greater than the other amount, the greater amount of data may be represented by a frequency hopping pattern and the smaller amount of data may be represented by the frame data. In the last case, since each transponder 20, 21 hops the frequency of subcarrier wave at the shorter period, the subcarrier wave is more effectively prevented from being interfered with by undesired waves. Thus, each transponder 20, 21 can enjoy improved reliability.

In the case where the size of each packet data in user's data is considerably great, for example, 128 bits, each transponder 20, 21 may divide each packet data, e.g., 128 bits into a plurality of sets of appropriate unit data, e.g., sets of four-bit unit data, each of which can be represented by a simple frequency hopping pattern as shown in FIG. 6.

FIG. 10 shows a predetermined relationship between hopping frequency and four-bit ID code of transponder, and a predetermined relationship between (A) (a1) hopping frequency and (a2) time slot and (B) bit value represented by each bit of four-bit transmission data. Those relationships are known, in advance, to the interrogator 10. As shown in the figure, it is not needed to use two different frequencies corresponding to two different bit values, (0) and (1), an arbitrary one of which can be represented by each bit, but it is possible to use a plurality of pairs of time slots each pair of which is combined with a corresponding one of a plurality of hopping frequencies and represent the two different bit values (0), (1), respectively. In an example shown in FIG. 10, a time slot, tn, where n is an even number represents the bit value (1), and a time slot tn where n is an odd number represents the bit value (0). This frequency hopping pattern is effective particular in the case where a great number of hopping frequencies cannot be used.

However, since the amount of data contained by each frame data is small, each pair of time slots may be replaced by a time difference that is measured from a reference time to a start end of a frame data, so as to represent a bit. This is a pulse-position modulation.

The time slots shown in FIG. 10 are for transmitting binary data, i.e., bits. However, it is possible to transmit multivalued data, i.e., symbol by starting each frame data at an appropriate one of more than four start positions.

The technique of hopping frequencies of subcarrier waves is not limited to the microwave-frequency-band transponders. Therefore, the present invention is applicable to a wireless tag that uses a carrier wave having a frequency of 13.56 MHz or 125 kHz, i.e., has a coiled antenna and communicates data or information by utilizing electromagnetic induction.

In the example shown in FIG. 6, each interrogator 20–22 hops the frequency of subcarrier wave the same number of times as the number of the bits that provide a unit data as at least a portion of the information signal. However, in each of the examples shown in FIGS. 6 through 10, a unit data may consist of a greater number of bit data, e.g., 32 bits or 64 bits. In addition, a unit data may consist of at least one symbol that consists of a plurality of bits as a unit.

In each of the examples shown in FIGS. 6 and 8, two different hopping frequencies represent two different bit values (0), (1), respectively. However, different hopping frequencies may represent different symbol values, respectively. For example, in the example shown in FIG. 6, each pair of hopping frequencies represent two different bit values (0), (1), respectively. However, each group consisting of four hopping frequencies may represent two bits, i.e., four different two-bit values, (00), (01), (10), (11), respectively, according to a predetermined rule.

In the example shown in FIG. 10, two different time slots represent two different bit values (0), (1), respectively. However, different time slots may represent different symbol values, respectively. In the example shown in FIG. 10, each pair of time slots represent two different bit values (0), (1), respectively. However, each group consisting of eight hopping frequencies may represent three bits, i.e., eight different three-bit values, (000), (001), . . . , (111), respectively, according to a predetermined rule.

While the present invention has been described in detail in its embodiments, it is to be understood that the present invention is not limited to the details of those embodiments and may be embodied with various changes and improvements, such as those described in SUMMARY OF THE INVENTION, which may occur to a person skilled in the art.

What is claimed is:

1. A transponder for use in a communication system including, in addition to the transponder, an interrogator which transmits a carrier wave to the transponder so that the transponder receives the carrier wave, modulates the received carrier wave, and returns the modulated carrier wave as a reflected wave to the interrogator, the transponder comprising:
   a carrier wave receiving and returning device which receives and returns the carrier wave transmitted from the interrogator;
   a frequency hopping device which hops a frequency of a subcarrier wave according to a frequency hopping pattern representing a unit data as a first portion of an information signal, and thereby modifies the subcarrier wave; and
   a carrier wave modulator which modulates, based on the subcarrier wave modified by the frequency hopping device, the carrier wave received by the carrier wave receiving and returning device, so that the carrier wave receiving and returning device returns the modulated carrier wave as the reflected wave to the interrogator.

2. The transponder according to claim 1, further comprising a subcarrier wave modulator which modulates the subcarrier wave based on a second portion of the information signal, wherein the carrier wave modulator modulates, based on the subcarrier wave modified by the frequency hopping device and modulated by the subcarrier wave modulator, the carrier wave received by the carrier wave receiving and returning device.

3. The transponder according to claim 2, wherein at least one of the first and second portions of the information signal comprises identification information usable to identify the transponder as a first transponder in distinction from a second transponder of the communication system, and wherein the unit data comprises transmission information to be transmitted, with the identification information, from the transponder to the interrogator.

4. The transponder according to claim 2, wherein the first and second portions of the information signal comprise a plurality of common bits, wherein the subcarrier wave modulator modulates, according to each of the plurality of common bits, a corresponding one of a plurality of portions of the subcarrier wave such that said each common bit is carried by the modulated one portion of the subcarrier wave, and wherein the frequency hopping device hops, according to the frequency hopping pattern representing the plurality of common bits, the frequency of each of the plurality of portions of the subcarrier wave to a corresponding one of a plurality of hopping frequencies that represent the plurality of common bits, respectively, such that said each common bit carried by the modulated one portion of the subcarrier wave that has one of the plurality of hopping frequencies differs from the common bit represented by said one of the plurality of hopping frequencies.

5. The transponder according to claim 4, wherein the frequency hopping pattern defines an initial hopping frequency representing at least a portion of an identification code identifying the transponder, and additionally defines, subsequent to the initial hopping frequency, the plurality of hopping frequencies respectively representing the plurality of common bits common to the plurality of bits carried by the modulated subcarrier wave, wherein the subcarrier wave modulator modulates, according to an initial one of the plurality of common bits, an initial one of the plurality of portions of the subcarrier wave such that the initial common bit is carried by the modulated initial portion of the subcarrier wave, and subsequently modulates, according to subsequent ones of the plurality of common bits, subsequent ones of the plurality of portions of the subcarrier wave such that the subsequent common bits are carried by the modulated subsequent portions of the subcarrier wave, respectively, and wherein the frequency hopping device hops, according to the frequency hopping pattern, the frequency of the initial portion of the subcarrier wave to the initial hopping frequency such that the initial common bit is carried by the modulated initial portion of the subcarrier wave that has the initial hopping frequency, and subsequently hops the frequency of each of the subsequent portions of the subcarrier wave to a corresponding one of the plurality of hopping frequencies respectively representing the plurality of common bits, such that the subsequent common bits are respectively carried by the modulated subsequent portions of the subcarrier wave that respectively have the plurality of hopping frequencies respectively representing the plurality of common bits.

6. The transponder according to claim 2, wherein the first and second portions of the information signal comprise a plurality of common symbols, wherein the subcarrier wave modulator modulates, according to each of the plurality of common symbols, a corresponding one of a plurality of portions of the subcarrier wave such that said each common symbol is carried by the modulated one portion of the subcarrier wave, and wherein the frequency hopping device hops, according to the frequency hopping pattern representing the plurality of common symbols, the frequency of each of the plurality of portions of the subcarrier wave to a corresponding one of a plurality of hopping frequencies that represent the plurality of common symbols, respectively, such that said each common symbol carried by the modulated one portion of the subcarrier wave that has one of the plurality of hopping frequencies differs from the common symbol represented by said one of the plurality of hopping frequencies.

7. The transponder according to claim 2, wherein the subcarrier wave modulator modulates the subcarrier wave according to the second portion of the information signal, the second portion comprising at least one frame data that is usable to identify the transponder as a first transponder in distinction from a second transponder of the communication system.

8. The transponder according to claim 7, wherein said at last one frame data comprises a portion of an identification code that identifies the transponder as the first transponder in distinction from the second transponder.

9. The transponder according to claim 7, further comprising a random number generator which generates a random number, wherein said at least one frame data comprises the random number generated by the random number generator.

10. The transponder according to claim 1, wherein the unit data consists of at least one bit.

11. The transponder according to claim 10, wherein the unit data consists of a plurality of bits, and wherein the frequency hopping device hops, according to the frequency hopping pattern representing the plurality of bits, the frequency of the subcarrier wave a plurality of times a total number of which is equal to a total number of the plurality of bits.

12. The transponder according to claim 10, wherein the unit data consists of said at least one bit that can represent an arbitrary one of two different bit values, and wherein the frequency hopping device hops, according to the frequency hopping pattern representing said at least one bit, the frequency of the subcarrier wave to one of two different hopping frequencies that represent the two different bit values, respectively, said one hopping frequency representing one of the two different bit values that is actually represented by said at least one bit.

13. The transponder according to claim 10, wherein the unit data consists of said at least one bit data that can represent an arbitrary one of two different bit values, and wherein the frequency hopping device hops the frequency of the subcarrier wave according to one of two predetermined frequency hopping patterns each of which comprises a combination of (a) a plurality of hopping frequencies and (b) a plurality of timings when the frequency of the subcarrier wave is hopped to the plurality of hopping frequencies, respectively, said one frequency hopping pattern representing one of the two different bit values that is actually represented by said at least one bit data.

14. The transponder according to claim 10, wherein the unit data consists of said at least one bit that can represent an arbitrary one of two different bit values, and wherein the frequency hopping device hops the frequency of the subcarrier wave according to the frequency hopping pattern comprising a combination of (a) at least one hopping frequency and (b) at least one pair of time slots that represent the two different bit values, respectively.

15. The transponder according to claim 1, wherein the unit data consists of at least one symbol.

16. The transponder according to claim 15, wherein the unit data consists of a plurality of symbols, and wherein the frequency hopping device hops, according to the frequency hopping pattern representing the plurality of symbols, the frequency of the subcarrier wave a plurality of times a total number of which is equal to a total number of the plurality of symbols.

17. The transponder according to claim 15, wherein the unit data consists of said at least one symbol that can represent an arbitrary one of a plurality of different symbol values, and wherein the frequency hopping device hops, according to the frequency hopping pattern representing said at least one symbol, the frequency of the subcarrier wave to one of a plurality of different hopping frequencies that represent the plurality of different symbol values, respectively, said one hopping frequency representing one of the different symbol values that is actually represented by said at least one symbol.

18. The transponder according to claim 15, wherein the unit data consists of said at least one symbol that can represent an arbitrary one of a plurality of different symbol values, and wherein the frequency hopping device hops the frequency of the subcarrier wave according to one of a plurality of predetermined frequency hopping patterns each of which comprises a combination of (a) a plurality of hopping frequencies and (b) a plurality of timings when the frequency of the subcarrier wave is hopped to the plurality of hopping frequencies, respectively, said one frequency hopping pattern representing one of the different symbol values that is actually represented by said at least one symbol.

19. The transponder according to claim 15, wherein the unit data consists of said at least one symbol that can represent an arbitrary one of a plurality of different symbol values, and wherein the frequency hopping device hops the frequency of the subcarrier wave according to the frequency hopping pattern comprising a combination of (a) at least one hopping frequency and (b) at least one group of time slots that represent the different symbol values, respectively.

20. The transponder according to claim 1, wherein the unit data consists of not greater than eight bits.

21. An interrogator for use in a communication system including, in addition to the interrogator, a transponder, the interrogator transmitting a carrier wave to the transponder so that the transponder receives the carrier wave, modulates the received carrier wave based on a subcarrier wave modified according to a frequency hopping pattern, and returns the modulated carrier wave as a reflected wave to the interrogator, the interrogator comprising:

a carrier wave transmitter which transmits the carrier wave to the transponder;

a reflected wave receiver which receives, as the reflected wave returned from the transponder, the carrier wave modulated based on the subcarrier wave modified according to the frequency hopping pattern;

a demodulator which demodulates the reflected wave received by the reflected wave receiver, into a demodulated signal;

a frame-data obtaining device which obtains, from the demodulated signal, at least one frame data;

a frequency hopping pattern recognizer which recognizes, from the demodulated signal, the frequency hopping pattern; and an information obtaining device which obtains, from said at least one frame data obtained by the frame-data obtaining device and the frequency hopping pattern recognized by the frequency hopping pattern recognizer, identification information usable to identify the transponder, and transmission information transmitted with the identification information from the transponder to the interrogator.

22. A communication system, comprising:
at least one interrogator; and
at least one transponder,
said at least one interrogator including
a carrier wave transmitter which transmits a carrier wave to said at least one transponder,
a reflected wave receiver which receives, as a reflected wave returned from said at least one transponder, the carrier wave modulated based on a subcarrier wave modified according to a frequency hopping pattern,
a demodulator which demodulates the reflected wave received by the reflected wave receiver, into a demodulated signal,
a frame-data obtaining device which obtains, from the demodulated signal, at least one frame data,
a frequency hopping pattern recognizer which recognizes, from the demodulated signal, the frequency hopping pattern, and
an information obtaining device which obtains, from said at least one frame data obtained by the frame-data obtaining device and the frequency hopping pattern recognized by the frequency hopping pattern recognizer, identification information usable to identify said at least one transponder, and transmission information transmitted with the identification information from said at least one transponder to said at least one interrogator, said at least one transponder including
a carrier wave receiving and returning device which receives and returns the carrier wave transmitted from the interrogator,
a frequency hopping device which hops a frequency of the subcarrier wave according to the frequency hopping pattern representing a unit data as a portion of an information signal representing the identification information and the transmission information, and thereby modifies the subcarrier wave, and
a carrier wave modulator which modulates, based on the subcarrier wave modified by the frequency hopping device, the carrier wave received by the carrier wave receiving and returning device, so that the carrier wave receiving and returning device returns the modulated carrier wave as the reflected wave to said at least one interrogator.

23. The communication system according to claim 22, comprising a plurality of said interrogators and a plurality of said transponders, wherein each one of the plurality of interrogators can identify each one of the plurality of transponders in distinction from the other transponders.

* * * * *